United States Patent [19]

Brachet

[11] 3,978,500

[45] Aug. 31, 1976

[54] PROCESS FOR RECORDING AND REPRODUCING IMAGES

[76] Inventor: Roland Francis Charles Brachet, Domaine d'Arnaga, 83810 Callian, France

[22] Filed: Nov. 21, 1973

[21] Appl. No.: 417,920

[52] U.S. Cl................................ 354/123; 352/46; 352/82; 354/115
[51] Int. Cl.².......................................... G03B 1/00
[58] Field of Search .......... 354/120, 123, 124, 115; 352/46, 87, 83, 82, 100, 61; 355/33

[56] References Cited
UNITED STATES PATENTS

| 2,045,129 | 6/1936  | Farrand   | 355/33    |
|-----------|---------|-----------|-----------|
| 2,175,114 | 10/1939 | Friedmann | 354/123   |
| 2,562,077 | 7/1951  | Winner    | 355/33    |
| 2,833,176 | 5/1958  | Ossoinak  | 354/115 X |
| 3,268,238 | 8/1966  | Finkel    | 352/87 X  |
| 3,387,547 | 6/1968  | Houghton  | 354/124   |
| 3,459,111 | 8/1969  | Cooper    | 354/123   |
| 3,463,581 | 8/1969  | Clay      | 352/100   |
| 3,491,669 | 1/1970  | McBride   | 354/123   |
| 3,666,465 | 5/1972  | Winner    | 355/33    |

*Primary Examiner*—John Gonzales
*Attorney, Agent, or Firm*—Oblon, Fisher, Spivak, McClelland & Maier

[57] ABSTRACT

A method of recording images on a photosensitive medium by making successive exposures of an object on to the medium through an array of lens elements adjacent the medium, each exposure producing a plurality of recorded sub-images on the medium, and moving appropriate parts of the system relative to each other between successive exposures so as to produce separation of the sub-images of the successive exposures.

6 Claims, 6 Drawing Figures

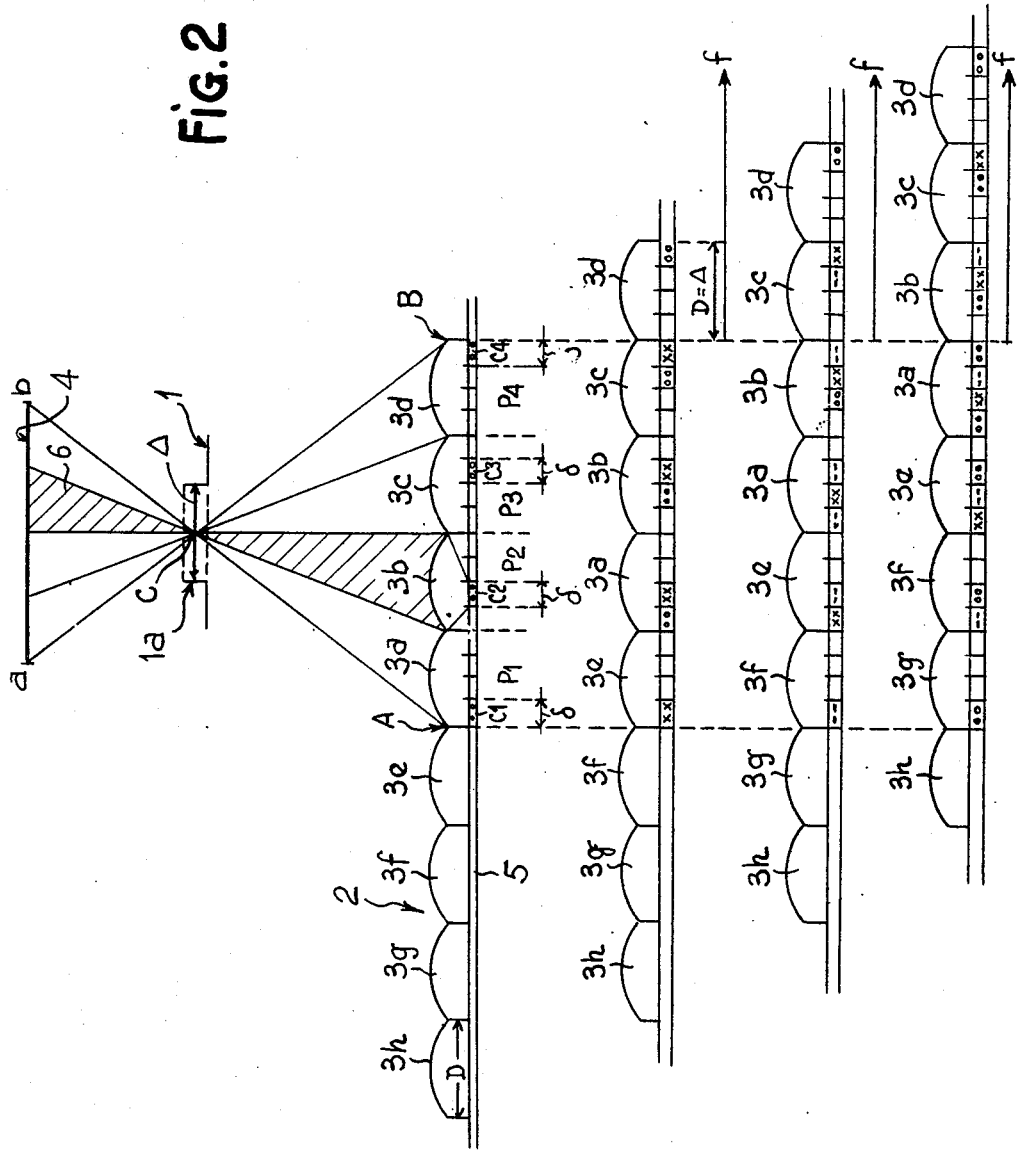

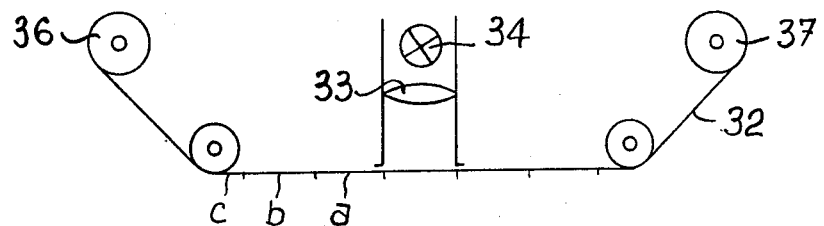
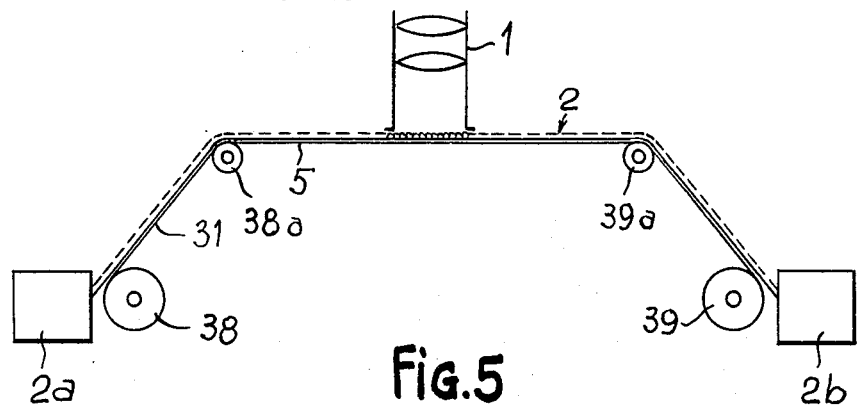
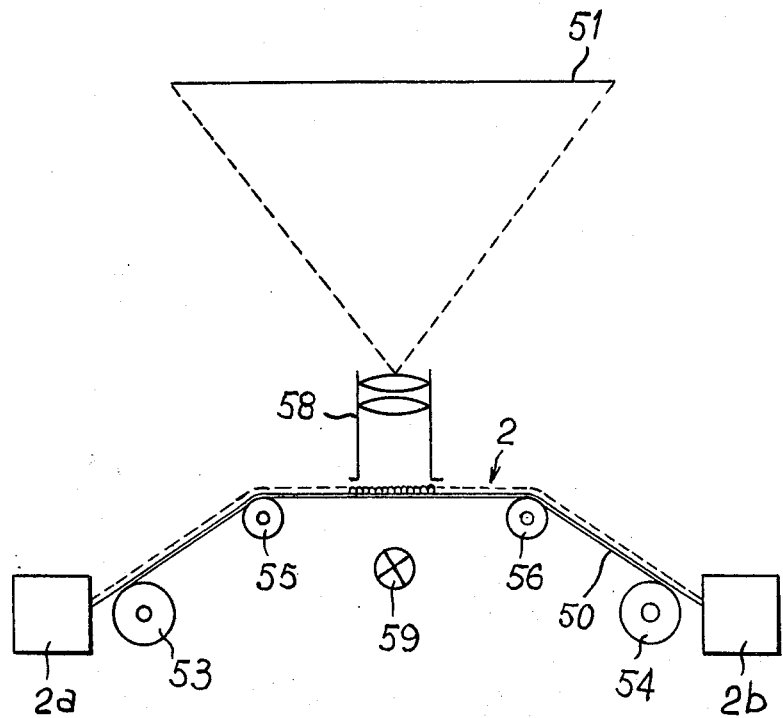

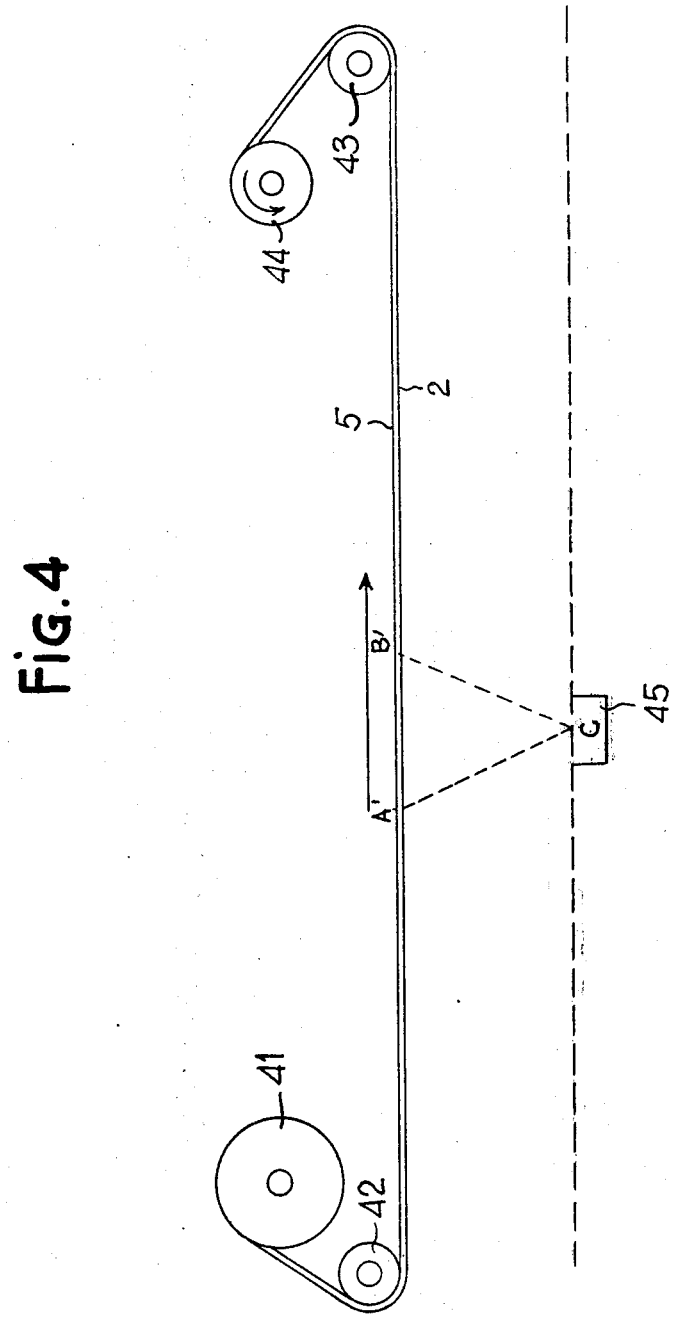

PROCESS FOR RECORDING AND REPRODUCING IMAGES

FIELD OF THE INVENTION

The present invention relates to a method for the recording and reproduction of photographic images.

The object of the invention is to provide a method for producing photographic images which create the sensation of moving images for the observer.

SUMMARY OF THE INVENTION

The method recording images according to the invention consists of taking successive photographs of an object on a photosensitive film through an objective lens and an array of parallel and adjacent plano-cylindrical lens elements, their planar faces being pressed against the photosensitive film and each photograph being taken after a relative movement of the array of lens elements and simultaneous movement of the film relative to the objective lens in a direction parallel to the surface of the film and perpendicular to the axes of the lens elements, of developing and fixing the said image-producing photosensitive film so as to form recordings of partial images thereon in the form of discontinuous parallel lines or stripes which together are capable of reproducing, through an array of lens components identical to that used for the taking of photographs and pressed by their planar faces against the developed and fixed film, a total image of the object at each relative point having been occupied by the optical center of the objective lens during recording of the images.

Each of the lens elements focusses the incident light it has received on a special longitudinal stripe of the sensitized surface and each image thus formed comprises a series of such stripes or lines. By virtue of the principle of reversal of light, the total image may be reproduced through an array of lens elements identical to that used for recording the image, to an observer setting the optical center of his crystalline lens on the relative position of the optical center of the objective lens which created the original image. At this observation point, the observer will form a reproduced or restored image on his retina and perceive it in its original form. When the eye of the observer is located at a point other than the observation point, it will not perceive a coherent image.

The location of the focussed stripe is a function of the angle of incidence of the pencil of light absorbed by each lens element. By moving the sensitized film and associated array of lens elements relative to the objective lens over a predetermined distance within the field of the objective lens, an entire series of distinct lines can be recorded on the width of sensitized film occupied by each lens element and it is therefore possible to record other total images each of which occupies a series of distinct lines and which are only reproduced by the observer at the point corresponding to the relative position of the optical center of the objective lens during the formation of each image.

If always the same object is photographed when the images are recorded, an observer moving along the developed film arranged behind the array of lens elements and suitably illuminated, will therefore see the same image appear as often as his eye moves to one of the observation points and will have the subjective sensation of an image associated with his movement.

On the other hand, if different objects or different relative positions of an object are photographed during the recording of images, the observer will see a succession of different images representing, for example, an animated scene comparable with that provided by a conventional cinematographic film.

It can therefore be seen that a film produced in accordance with the method of the invention permits a moving observer to perceive images associated with his movement or a succession of animated images without auxiliary optical systems other than the described array of lens elements. In addition, the method according to the invention makes it possible for a substantial number of images to be recorded on a given length of sensitized film since the width of each individual line may be very little in front of the diameter of the corresponding lens element. For the recording and reproduction of images with larger dimensions, the invention provides a method which consists of taking successive photographs of an object on a photosensitive film through an objective lens and an array of parallel and adjacent plano-cylindrical lens elements, their planar faces being pressed against the photosensitive film, each photograph being taken after a relative movement of the array of lens elements and simultaneous movement of the film relative to the objective lens in a direction parallel to the film surface and perpendicular to the axes of the lens elements, and of developing and fixing the image-producing photosensitive film and producing a positive enlargement with a predetermined enlargement ratio of the developed and fixed film so as to obtain a positive film comprising recordings of partial images in the form of discontinuous lines capable of reproducing a total image of the object at each common relative point corresponding to a point occupied by the optical center of the objective lens during the taking of photographs when there is applied to the positive film an array of lens elements having the same optical characteristics as the array used for photographing, the dimensions of individual lens elements of such array and particularly their movement however being enlarged in the same ratio of enlargement used for enlarging the developed film.

For the production of films of images being very large in dimensions and easily reproducible, the invention provides a method of recording images which consists of taking successive photographs of an object on a photosensitive film through an objective lens and an array of adjacent and parallel plano-cylindrical lens elements, their planar faces being pressed against the photosensitive film, each photograph being taken after a relative movement of the array and simultaneous movement of the film relative to the objective lens in a direction parallel to the film surface and perpendicular to the axes of the lens components, and of developing and fixing the image-producing photosensitive film, producing an enlarged print in a predetermined ratio in a known manner from the developed and fixed film, printing a support film with the aid of the negative thus obtained and according to a known method and applying to the printed film obtained an array of lens elements having the same optical features as the array of lens elements used for recording images on the photosensitive film, the dimensions of the images being greater than those of the latter array in a ratio of enlargement identical to that used for producing the print so as to obtain an arrangement in which the printed film comprises recordings of partial images in the form of discontinuous lines capable of combining to reproduce a full image of the object at each common relative point corresponding to a point occupied by the optical center of the objective lens during the taking of photographs.

The invention also relates to films produced in accordance with the method of the invention and provided with an array of lens elements for reproducing full recorded images on the film during a relative movement between the film/array of lens elements and an observer located at a distance from the film substantially equal to the distance between the film and the optical center of the objective lens during the recording of images.

BRIEF DESCRIPTION OF THE DRAWINGS

The invention will be better understood on reading the following description and examining the accompanying drawings which show, by way of examples, several modes of operation of the method for recording images according to the invention and two embodiments of an apparatus for reproducing the said images.

In these drawings:

FIG. 2 is a diagram illustrating the successive formation of several images through a step-by-step advance of the sensitized film and array of lens elements relative to the objective lens;

FIG. 3 schematically represents a modification of the method for recording images according to the invention;

FIG. 4 is a schematic representation of an apparatus for reproducing or restoring images according to the invention; and FIG. 5 is a schematic representation of an apparatus for projecting images on to a screen.

In the accompanying drawings, the corresponding elements shown in the different figures always have the same reference numerals.

DESCRIPTION OF EMBODIMENTS

The embodiments described and illustrated hereafter are greatly simplified to permit clear explanation; the step-by-step advance of the lens elements is in practice usually very small in the field of the objective lens, whereas this movement is exaggerated in the accompanying drawings.

Figure 1:
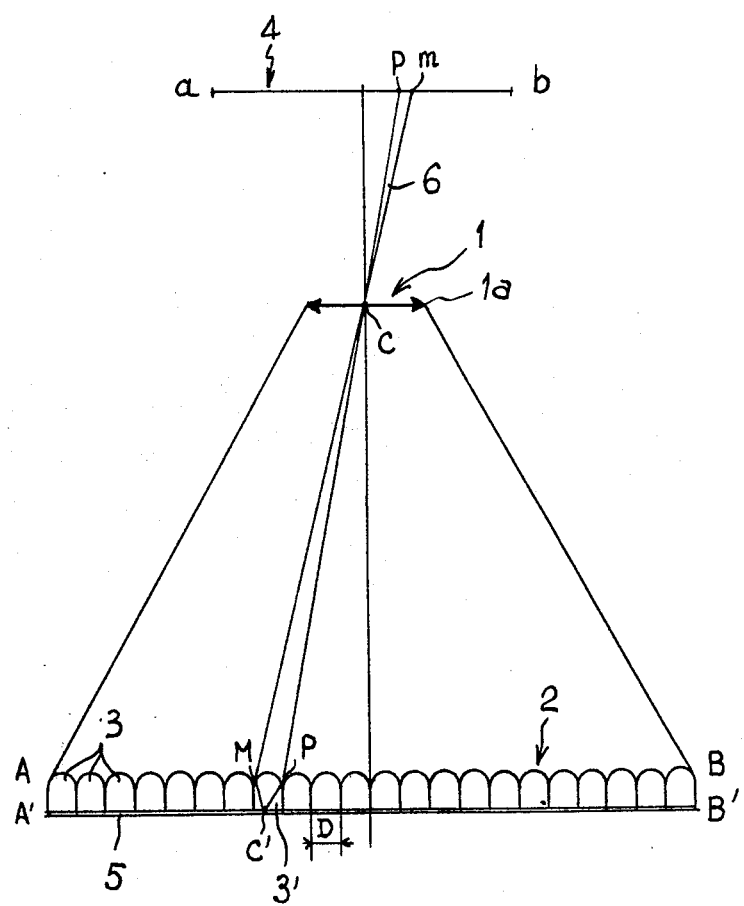
FIG. 1 is a schematic representation illustrating the fundamental principle of image recording according to the invention.

The method according to the invention is based on the formation of striated sub-images with the aid of cylindrical lens elements as shown in FIG. 1. This figure shows an object to be photographed ab arranged in front of a photographic objective lens 1 of a known type with a center C which is provided with a diaphragm 1a and behind which is arranged a half-tone screen 2 applied against a photosensitive film 5 provided with an appropriate emulsion. The complex surface AB of the striated screen 2 is formed by a large number of parallel and juxtaposed plano-cylindrical lens components 3. Each of the lens components 3 in turn forms its image C' of the center C of the objective lens 1 on the surface A'B' of the sensitized film 5.

If the face MP of any one of the lens elements 3 is considered, a pencil of light 6 originating in the area mp of the object 4 corresponding to the area MP, through the center of the objective lens 1, is focussed through the lens element 3' at the point C'. On the sensitized surface A'B' of the film 5, each lens element 3 therefore forms an elementary line of little width relative to the diameter D of the lens element. Beyond this line no secondary image is formed on the sensitized surface A'B'.

After treatment of the image-producing emulsion, i.e. after development and fixing, an array of cylindrical lens elements identical to that used for recording images is pressed on to the developed film. It is noted that the arrangement thus obtained exhibits special optical properties on account of the principle of light reversal. An observer setting the optical center of the crystalline lens in his eye at the relative position of the optical center of the objective lens 1 which created the original image will have a reproduction of this image formed on his retina and consequently perceive it in its original form. The lines C' constituting partial images will combine to form, in the eye of the observer, a total image identical to the original appearance of the object. Any image may be reproduced outside the point C corresponding to the optical center of the objective lens 1.

It is found that each line or sub-image occupies only a very small part of the surface of the photosensitive film occupied by each individual lens 3 of the array. It is therefore possible to form a great number of lines, that is to say, partial images, in juxtaposition by modifying each time the relative position of one of the three elements comprising the objective lens 1, the array 2 of lens components and the photosensitive strip of film 5 relative to the other two elements in a direction parallel to the plane of the film 5 and perpendicular to the axes of the lens components 3. In the first case it is ensured that on each movement the angle of incidence of the pencil of light on each lens component is modified, and in the second case the position of the film relative to the array or screen 2 and objective lens 1 is modified. In the first case the pencil of light is also focussed at another point C', and in the said second case focussing remains constant, but another point of the film 5 is moved under the focussing point C'.

However, to obtain an effective result the film 5 is moved together with the array 2 of lens components relative to the objective lens 1 in a direction parallel to the surface of the film 5 and perpendicular to the axes of the lens components 2. This type of image recording is schematically represented in FIG. 2.

In FIG. 2 there can be seen a photosensitive film 5 on to which are pressed the planar surfaces of an array of parallel and juxtaposed plano-cylindrical lens elements 3 comprising the individual lenses 3a to 3h. The film 5 and the array of lens elements are advanced together relative to a photographic objective lens 1, the optical center of which is designated by the reference C, in a direction f parallel to the surface of the film 5 and perpendicular to the axes of the lens elements 3a to 3h. The objective lens 1 is in this case fixed and projects an image of predetermined width AB onto both the screen of lens elements and the film. In the greatly simplified embodiment the total image created by the objective lens 1 only covers, for reasons of clarity, four lens elements 3a to 3d suitably arranged in front of the objective lens so as to occupy predetermined positions, P1,P2,P3,P4 respectively. In this case the objective lens 1 and lens elements 3 are selected and adjusted in such a manner that the lens elements can focus four lines or partial images as a function of their location in one or other of such positions. The element 3a arranged in position P1 focusses the light it receives on a line C1 on the extreme left-hand side, the element 3b arranged in position P2 focusses the light on an intermediate left line C2, the element 3C in position P3 on an intermediate right line C3 and the element 3d arranged in the extreme right-hand position C4. It can be seen that after first exposure only one line for every lens element produces an image, but that the relative positions of these lines are different.

Then, the film and array of lens elements are moved forward by one step which is equal in this case to the diameter of a lens element D so that the elements 3e,- 3a,3b and 3c are in positions P1 to P4, respectively, and a new exposure is effected.

Following another forward step, the elements 3f,3e,3a and 3b occupy positions P1 to P4, respectively, and are exposed. Finally, after a third forward step, the elements 3g,3f,3e and 3a occupy positions P1 to P4, respectively. It can be seen that in the first exposures the lens elements leaving the field of the objective lens did not allow all the lines to be exposed, as is the case with the elements 3d, 3c and 3b. On the other hand, the lines will be fully exposed with the elements 3a,- 3e,3f,3g,3h, i.e. the parts of the film 5 pressed against the planar faces of these elements are fully exposed and occupied by partial images of the photographed total images, which permits substantial economy in the case of films.

It will be noted that FIGS. 1 and 2 show extremely simplified embodiments, the object being to facilitate understanding of the basic phenomenon of the method according to the invention. As will be easily understood from the following description, the embodiment shown in FIG. 2 comprising only four lens elements which focus four different lines and which, with each step, are moved forward with the sensitized film for a distance equal to the diameter of a lens element, can only achieve very mediocre results having little practical value.

By studying in more detail the path of the pencils of light emitted by the object 4, via the objective lens 1 and the lens element 3, it is considered in a conventional manner that the width δ of the line C1 focussed by the element 3a on the film 5 is the width Δ, that is to say, the aperture Δ of the diaphragm 1a of the objective lens 1. To avoid any mutual overlapping in the partial images of width δ, it is therefore necessary to move the film 5 and associated array of lens elements forward, between each of the successive exposures, by a distance equal to or greater than the aperture Δ of the diaphragm of the objective lens 1. When this movement is equal to the aperture Δ of the diaphragm, there are obtained on the film 5 parallel and juxtaposed lines or sub-images which cover the entire film surface with the exception of a first portion which is only partially occupied, as explained above. It will be noted that in FIG. 2 the diameter D of the lens elements 3a to 3h is equal to the aperture Δ of the diaphragm 1a, which constitutes an altogether special embodiment. The diameter D is normally small in front of the aperture Δ of the diaphragm. Moreover, when the number of sub-images can be further reduced in numerous applications, the film 5 and associated screen or array are moved forward, between each exposure, for a distance which is distinctly greater than the opening diameter Δ of the diaphragm, 1a. In this case lines or parallel sub-images C1 regularly spaced therebetween are obtained on film 5. Moreover, each forward movement of the film 5 and array 2 can be greater than one or several diameters D of the individual lens elements. Each element 3 therefore no longer receives all pencils of light 6a to 6d from the object and therefore no longer focusses the entire image in the form of separate lines on the film 5, but the series of sub-images created by the lens elements located in the field of the objective lens at the time of each exposure always permits the full image to be restored to the optical center C of the objective lens 1.

It can therefore be seen that all the parameters formed by the diaphragm aperture of the objective lens, the aperture or diameter of the lens elements and enlargement, i.e. the proportion between the dimensions of the full recorded image and those of the photographed object, determine the geometric width of the image of the diaphragm 1a through the lens elements. The maximum number of separable partial images produced by each lens element is expressed in this case by:

$$\eta = \frac{\omega}{\Omega}(G + 1)$$

in which formula, $\Omega$ is the numerical aperture of the diaphragm 1a of the objective lens, $\omega$ is the numerical aperture (D) of the lens elements 3, and G is the enlargement.

This formula seems to show that $\Omega$ can be diminished at will to increase $\eta$. However, diffraction phenomena which occur not only in the objective lens 1, but also in each lens element limit the reduction of values $\Omega$ and $\omega$. These limitations restrict the objective lens to a minimum aperture of:

$$2\frac{\lambda}{d}(G + 1)$$

where $\lambda$ is the wavelength of light used, $d$ the width of a lens component 3, and $G$ the said enlargement.

The maximum number of discernible partial images determined by diffraction is expressed as:

$$n = \omega \frac{d}{\lambda} 2\lambda$$

In an example in which $\omega = 0.3$, $d = 0.4$ mm, and $\lambda = 0.6 \times 10^{-3}$ mm, a maximum number of partial images per lens element is obtained, $n = 100$.

Figure 2A:
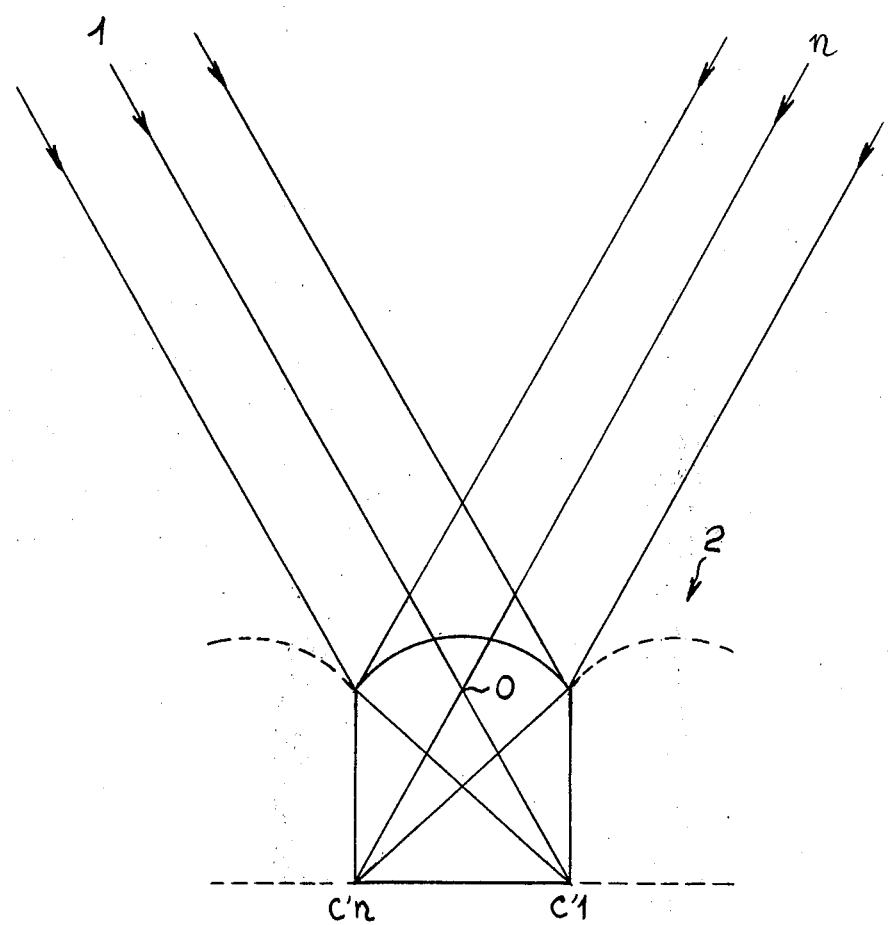
FIG. 2a is a schematic representation of one lens element of the array of lens element used in accordance with the method of the invention.

With reference to FIGS. 1, 2 and 2a, it will be noted that the angle of view of the objective lens 1 is not free, but must be adapted to that of the lens elements 3 of the array 2. In effect, when a lens element 3 as shown in FIG. 3 reaches the field of view of the objective lens 1 during its movement with the film 5, it must form the first partial image at C'n at its left hand end (in the case of a forward movement from left to right). After the formation of intermediate images, the lens element 3, on leaving the field of view of the objective lens 1, has to form its last image at its right hand end at C'1 (FIG. 2a). In FIG. 2a the reference O designates the optical center of the lens element 3 which enters the field of view along the beam O1 by forming the corresponding line at C'1. The optical center O leaves the field of view along the medium beam On by forming the last line at C'n. To obtain these two lines at C'1 and C'n, the angle C'n O C'1 must be substantially equal to aCb in FIG. 1.

FIG. 3 is a schematic representation showing a modification of the method of recording images according to the invention.

In this mode of operation, a film 31 provided with a layer of a photosensitive emulsion 5 is moved together with a screen or array of lens elements of the type described above, behind a conventional photographic objective again designated by reference numeral 1. The photosensitive film 31 is unwound from a roller 38 and moved forward together with the array 2 of lens elements step by step in front of the objective lens 1 and a photograph or exposure effected after each forward movement of the elements 2 and 31. Then, the sensitized film is separated from the screen 2 and wound on to a second roller 39. The array of lens elements 2 is in this case preferably in the form of a continuous line of parallel and juxtaposed plano-cylindrical lens elements, the axes of which are perpendicular relative to the direction of forward movement of the film 31. This series of lens elements is distributed from a distributor 2a, its planar face being pressed by suitable means (not shown here) on to the sensitized film 31 and moved forward stepwise with the latter behind the objective lens 1 and then separated from the film 31 to be fed into a receiving apparatus 2b. . In this connection film quide means are schematically represented by two pulleys or rollers while the means for controlling the stepwise advance of the film 31 and lens elements 2 (not shown here) may be of any known type used for example in high-precision cinematographic cameras for taking scientific photographs. The object to be photographed in this case comprises views of a conventional contact film 32 which may be projected by means of a second objective lens 33 illuminated by a light source 34. Means schematically represented by a supply reel 36 and a receiving reel 37 permit the film 32 to move, image by image, in front of the objective lens. The forward movements of the film 32 and the sensitized film 31 with the lens elements 2 are effected synchronously with the aid of known means (not shown). The process for forming images on the photosensitive film is the same as that explained above. After each photograph is taken, the film 32 is moved forward for a distance equal to the length of one of the images a', b', c' while the sensitized film 31 and array of lens elements 2 are advanced by one step which constitutes a small fraction of the length of an image on the film 32 as explained above. This permits substantial saving in sensitized film which is particularly advantageous when the film 32 carries data or documents or even different images of an animated cinematographic scene since the reduction in the weight and volume of film reels thus obtained facilitates the transportation, storage and manipultion of reels to a great extent.

A photosensitive film which produces images according to the method of the invention and is developed and fixed can be used as it is, to directly reproduce full recorded images through an array of lens elements identical to that used for recording images. When the photosensitive film in use is a negative film, the images can be reproduced through an objective lens and projected on to a screen. An apparatus for this type of reproduction of recorded images according to the method of the invention is shown as a schematic representation in FIG. 5. This apparatus allows the full recorded images, recorded on a transparent film 50 according to the method explained with reference to FIG. 1, to be projected on to a screen 51. This apparatus comprises a supply reel 53, a receiving reel 54 and two rollers, 55,56 over which passes the part of the film to be scanned. An array of lens elements, identical to that used during the recording of images on the transparent film and in the form of a series of juxtaposed lens elements perpendicular to the forward direction of the film 50, is moved from a distributor 2a, pressed on to the film 50, moved forward with the latter behind the objective lens 58 and then separated from the film 50 to be fed into a recovering apparatus 2b. The objective lens 58 which is illuminated by a light source 59 is arranged by its optical center at the same distance from the plane AB of the lens array as the optical center C of the objective lens 1 used in the recording of images (FIG. 1).

In accordance with the principle of reversal of light, whenever the objective lens 58 and film 50 with the lens array 2 are in a relative position corresponding to the formation of lines of partial images as shown in FIG. 1, a total image identical to the photographed object will be projected on to the screen 51. An animated scene can therefore be reproduced on the screen by causing the film 50 to move continuously at a uniform speed without the need to use a shutter or handle for driving the film step by step, as in the case with a conventional cinematographic projector.

When the film 50 is a positive/negative film (transparencies), the objective lens 58 may be omitted and, by directing the crystalline lens of his eye to the position of the optical center of the objective lens, the observer can directly reproduce successive total images on his retina.

Finally, when a positive copy of the negative film is produced in accordance with the method of the invention, the light source 59 can again be removed and the observer, directing the optical center of his crystalline lens into the relative position of the objective lens 1 (FIG. 1), can reproduce the successive total images of an animated scene by causing the film 50 to move past continuously with the lens array 2.

When recording and reproducing different successive images of an animated scene, for reproduction by moving the film and lens array relative to a stationary observer, the film 5 and lens array are caused to move vertically to prevent the observer from reproducing two different images of the scene with his two eyes. Both eyes of the observer are in effect located on the same horizontal line and each of them must perceive the same total image at the same moment. This applies to any relative movement between the film and the observer where the right and left eye images can correspond to very different images. On the other hand, in a case where the two images have some notable difference, either they are identical or in the case of animated images the time intervals between them are very short, a relative horizontal movement between the film 5 and the observer can be used. This is the case with a traveller moving in front of a fixed film with vertical cylindrical lens elements. When the observer is moving in a vertical direction, for example in a lift, the lens elements applied to a fixed film 5 are horizontal. In accordance with the method of the invention, a positive copy enlarged in a predetermined ratio can be made from an imageproducing photosensitive film. Pressed on to this positive film is an array of parallel and juxtaposed plano-cylindrical lens elements having the same optical properties as the array of lens elements used for recording the images, but having larger dimensions than those of the latter array of lens elements which are enlarged in the said ratio of enlargement used for producing the said positive copy. During a relative movement between an observer located at a distance from the larger array of lens elements equal to that between the optical center of the objective 1 and the array 2 (FIG. 1) during recording, and the positive film with the lens array, the recorded total images will be restored on the retina of the observer, through his crystalline lens, whenever the relative position of the optical center of his crystalline lens corresponds to that of the optical center.

The observer, moving at a certain distance along such a film, will discover how the total images are progressively recorded. A particularly interesting effect is obtained if the various recorded total images are identical. In this case the observer will experience the sensation of an image associated with his person during his entire movement. On the other hand, when the recorded total images comprise images of an animated scene, the observer will discover this scene gradually as he moves. Such a reproduction of images of an animated scene by a moving observer cannot be achieved with conventional cinematographic techniques.

The same results are obtained when the enlarged positive film moves continuously at a uniform speed past a stationary observer. An apparatus for this reproduction of images is schematically represented in FIG. 4. In this apparatus, the positive film carrying the partial images is unwound with the larger array 2 of lens at a continuous and uniform speed from a supply reel 41, passed over two guide rollers or pulleys 42, 43 and wound onto a receiving reel 44. In the area A'B' of the part of the film 5 extended between the two rollers 42 and 43, the total images will be visible to an observer positioned at 45 at a distance from the observed area A'B' of the film equal to the distance between the center C of the objective lens 1 and the plane A'B' of the lens array 2 during the formation of images (FIG. 1). Therefore, if the successive images of an animated sequence are recorded on the film, the observer positioned at 45 (FIG. 4) will perceive the scene formed by successive total imges even though the movement of the film with the array of lens elements is effected at a continuous uniform speed.

In accordance with another embodiment of the method of the invention an enlarged printing block which is then used to print support films of large dimensions on paper or a similar material can be produced from the sensitized film exposed in the manner described above. Cylindrical lens elements in the form of a line of juxtaposed parallel elements are then applied against these films. These lens elements have the same optical features as the lens elements used when recording images, but having larger dimensions than those of the photographic lens elements with the same ratio of enlargement used for producing the said printing block.

This embodiment is intended particularly for the production of printed films of very large dimensions. These films can be affixed to the walls in the corridor of a public building or to fixed panels arranged along a road or in a tunnel or the like. They are read by the observer moving on foot, in a motor vehicle or train past these films in a direction perpendicular to the array of lens elements attached to the film and at a predetermined distance equal to the distance between the photosensitive film and the optical center of the objective lens used when recording images. These films can therefore serve to transmit to the moving observer always the same image, for example, an instruction, notice, or an advertising image.

In the case of images having larger dimensions, the film carrying the partial images is preferably and integral with the array of lens elements. The two components can be joined, for example, by adhesion or any other appropriate means. In the event of a photosensitive film being produced without subsequent enlargement, the sensitized film and array of lens elements can likewise be integral. A pellicle or film of photosensitive emulsion can for example be spread on the planar face of a series of parallel nd juxtaposed plano-cylindrical lens elements.

The invention is obviously not limited to the described and illustrated embodiments, but numerous modifications of details can be effected without departing from the scope of the invention.

For example, a double array of spherical lens elements having, in a known manner, the same characteristics obtained can be used in place of the array of cylindrical lens elements and can therefore obtain the desired results.

On the other hand, it is not always necessary to use all possible lines of the array of cylindrical lens elements. In reading a sequence of component images, the eye of the observer is limited by the persistence of vision and for this reason it would appear unnecessary to exceed a frequency of 25 images per second for reproducing an animated scene recorded in accordance with a method of the invention. In practice, the number of necessary images depends therefore on the relative speed between the observer and image-producing film and will therefore be determined in each application; for example, for images to be observed by a person moving on foot or at a speed of approximately one meter per second, it is sufficient to use a resolving power of 8, but to obtain very sharp images it is advantageous to use a resolving power between 30 and 100.

I claim:

1. A method of recording images on a supporting surface which permits an observer, in the case of relative movement between said observer and said supporting surface along a line substantially parallel to said supporting surface, to perceive images located at each moment on said supporting surface at a predetermined angle of observation relative to said observer such as to present an appearance to said observer that substantially no relative movement along said line is occurring between said images and said observer, said images being identical or successive images of an animated scene, comprising the steps of:

taking a plurality of successive photographs of an object on a photosensitive film band of a given length through an objective lens and a plurality of parallel and juxtaposed plano-cylindrical lens elements having the planar faces thereof in contact with said photosensitive film band, said planar surfaces of said plurality of lens elements forming an overall length at least equal to the length of said photosensitive film band;

causing relative movement between said photosensitive film band and said lens elements together on the one hand and said objective lens on the other hand along a line parallel to the surface of said film band and perpendicular to the axes of said lens elements between the taking of successive photographs;

maintaining the axis of the rays of light forming the image for each photograph at a constant angle relative to the surface of said photosensitive film band for all of said successive photographs, while forming a full image of the object for each photograph through said objective lens on a predetermined number of said lens elements and forming a linear partial image of the object for each photograph through each of said predetermined number of said lens elements onto said film band being of a linear extent on said film band equal only to a fractional part of the width of one of said lens elements; and developing and fixing the exposed photosensitive film band so as to form thereon recordings of the partial images formed by each photograph in the form of discontinuous parallel lines or stripes which together may be reproduced through a plurality of lens elements identical to those used for taking said photographs and having the planar faces thereof in contact with the developed and fixed film as a full image of the object of each photograph at a point corresponding to the position of the optical center of the objective lens during the taking of that photograph.

2. A method claimed in claim 1, characterized in that said step of causing relative movement between said photosensitive film band and said lens elements together on the one hand and said objective lens on the other hand consists of moving the photosensitive film and said lens elements forward along said line parallel to the surface of said film band and perpendicular to the axes of said lens elements by a distance at least equal to the aperture of the diaphragm of said photographic objective lens.

3. A method as claimed in claim 1, characterized in that it consists of producing full images comprising from thirty to a hundred partial images.

4. A method as claimed in claim 1 including the step of producing an enlargement with a predetermined enlargement from the developed and fixed film so as to form on said enlargement recordings of the partial images formed by each photograph in the form of discontinuous parallel lines or stripes which together are capable of reproducing, through a plurality of lens elements similar to those used for taking the photographs but whose width is greater than that of the lens elements used for taking the photographs by said predetermined enlargement, and whose planar faces are in contact with the enlargement, a full image of the object of each photograph at a point corresponding to the position of the optical center of the objective lens during the taking of that photograph.

5. A method as claimed in claim 1 including the steps of producing a printing block from the developed and fixed film, and printing a support film with the block so as to form thereon recordings of the partial images formed by each photograph in the form of discontinuous parallel lines or strips which together are capable of reproducing, through a plurality of lens elements having the same optical characteristics as those used for taking the photographs and with their planar faces in contact with the support film, a full image of the object of each photograph at a point corresponding to the position of the optical center of the objective lens during the taking of that photograph.

6. A method as claimed in claim 1 wherein said step of maintaining the axis of rays of light forming the image for each photograph at a constant angle relative to the surface of said photosensitive film band comprises maintaining said axis perpendicular to said surface of said film band.

* * * * *